Oct. 8, 1929.  R. A. CROCKETT  1,731,160
BRAKE FOR ROAD VEHICLES
Filed Oct. 27, 1927   2 Sheets-Sheet 1
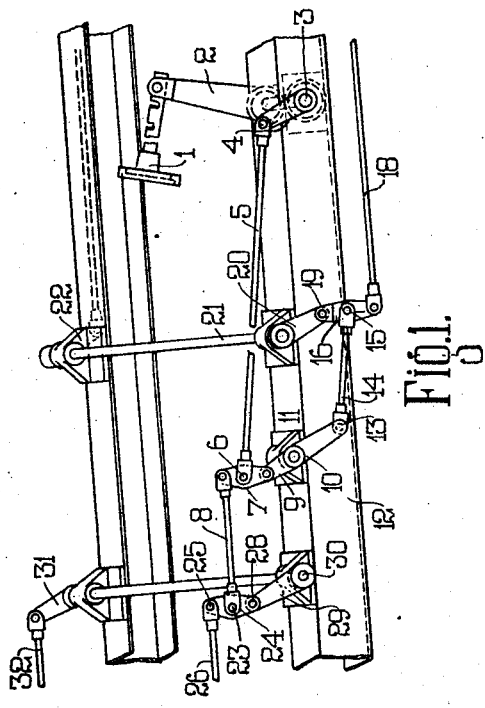
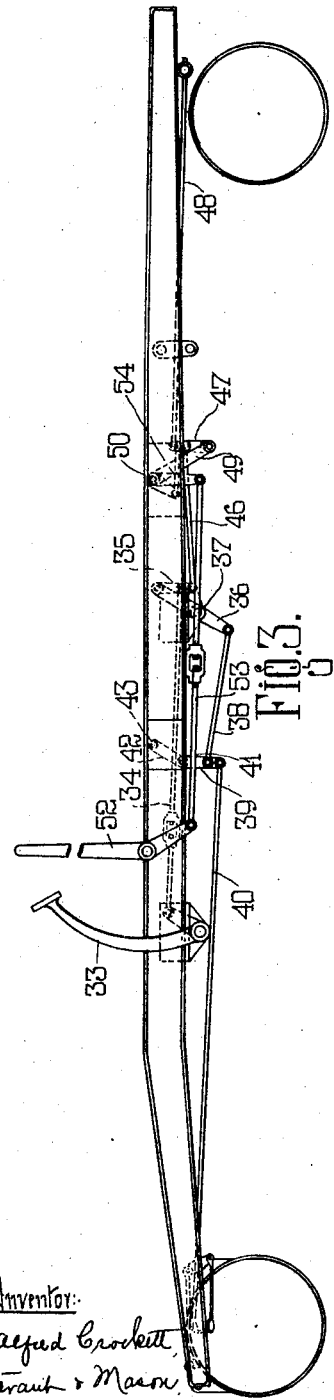
Inventor:
Robert Alfred Crockett
By Sturtevant & Mason
Attorneys Oct. 8, 1929.  R. A. CROCKETT  1,731,160
BRAKE FOR ROAD VEHICLES
Filed Oct. 27, 1927  2 Sheets-Sheet 2
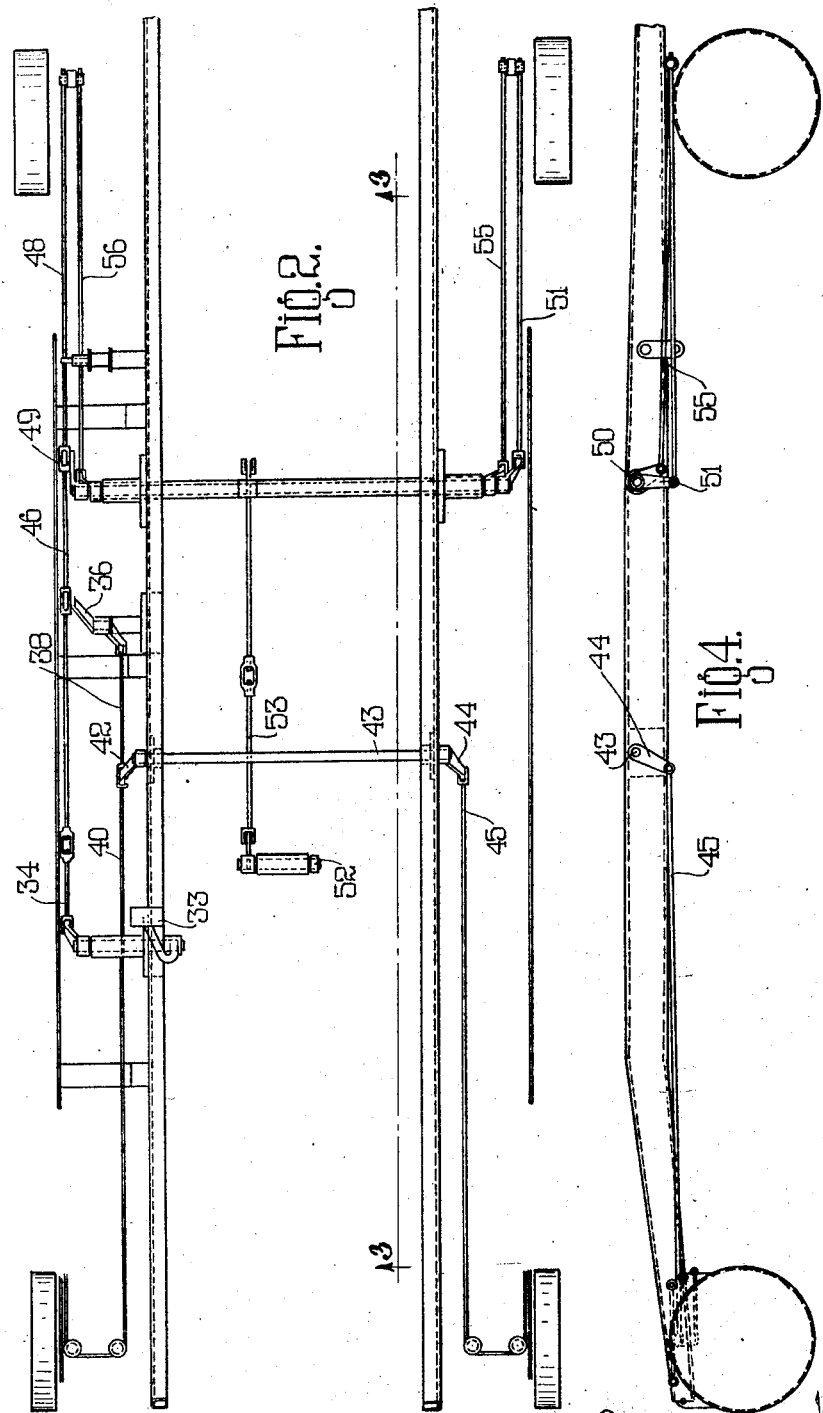

Patented Oct. 8, 1929

1,731,160

UNITED STATES PATENT OFFICE

ROBERT ALFRED CROCKETT, OF LIVERPOOL, ENGLAND

BRAKE FOR ROAD VEHICLES

Application filed October 27, 1927, Serial No. 229,107, and in Great Britain October 27, 1926.

The present invention relates to improvements in brakes for road vehicles.

According to the present invention four separate and independent brakes are operated from a common control arm through linkage which includes three fully floating compensating yokes so that the torque applied to each of the four separate brakes is equalized.

The brake operating arm is connected to the centre of a yoke the ends of which are connected respectively to the centres of two yokes, one end of each of which is connected directly to a brake on one side of the vehicle, whilst the other end is connected to a crank arm on a cross shaft passing laterally across the vehicle and which has at its opposite end a second crank arm connected to a brake on the opposite side of the vehicle.

The invention is more particularly described with reference to the accompanying drawings in which:—

Figure 1 is a diagrammatic view of the improved brake gear.

Figure 2 is a plan view of a slightly modified form of the gear as fitted to a front or rear wheel braked automobile vehicle.

Figure 3 is a sectional side elevation on the line 3—3 of Figure 2.

Figure 4 is a side elevation of the arrangement of Figure 2.

A foot pedal, such as 1, Figure 1 is adjustably clamped to the operating arm 2 keyed to a spindle 3, to which is also keyed an arm 4 connected to a link 5, which in turn is freely pivoted at 6 to a yoke 7, to which is pivoted a link 8 on the one hand, and the end 9 of a lever 10 on the other hand, which is pivoted at 11 to the fixed frame 12, whilst it is also pivoted at 13 to a connecting rod 14 which is pivoted at 15 to a yoke 16 pivoted on the one hand to a connecting rod 18 connected to one brake, and pivoted on the other hand at 19 to an arm 20 keyed to a shaft 21 passing across the vehicle, and having an arm 22 connected to a second brake.

The connecting rod 8 is pivoted at 23 to a yoke 24 pivoted on the one hand at 25 to a connecting rod 26 connected to a third brake and on the other hand, pivoted at 28 to an arm 29 keyed to a shaft 30 passing across the vehicle, and having an arm 31 keyed to it pivoted to a connecting rod 32 for operating the fourth brake.

These brakes may conveniently be the brakes on the front and rear wheels respectively of an automobile vehicle.

It will be noticed that the yokes 7, 16 and 23 lie in one and the same vertical plane.

In the construction shown in Figures 2 to 4 the foot pedal 33 is connected by a connecting rod 34 to a floating link 35 pivoted to a yoke 36 which in turn is carried by a fixed pivot 37 on the frame. This yoke 36 is in turn connected by a link 38 to a freely floating yoke 39 having a direct connection 40 to one brake, and pivoted at 41 to an arm 42 carried on a spindle 43 turning in bearing on the frame, and having an arm 44 on the opposite side of the vehicle provided with a direct connection 45 to the other front wheel brake.

The freely floating yoke 35 is connected by a link 46 to a freely floating yoke 47 connected on the one hand to a connecting rod 48 for the direct operation of one of the back brakes, whilst it is also pivoted to the arm 49 keyed to a shaft 50 passing across the car and having a direct connection 51 with the other back wheel brake.

The hand brake lever 52 is connected by a connecting rod 53 to an arm 54 turning as a sleeve about the shaft 50, and has in this case connections 55, 56 to separate brakes on the wheels of the vehicle.

It will be consequently seen that if for example the connections to three of the four brakes are slack as compared with the fourth, and even if these connections are slack to different extents, yet on application of the brake lever the brakes will be applied evenly at all four points owing to the triple compensation.

I declare that what I claim is:—

1. A control for the four wheel brakes of road vehicles, comprising a brake operating arm, a floating yoke lying in a vertical plane, a connection between said floating yoke and said brake operating arm, a pair of yokes also lying in a vertical plane, connections from the floating yoke to the pair of yokes and connections from the floating yokes to the brake devices.

2. A vehicle brake control comprising a brake operating arm, a floating yoke, in a vertical plane, a connection between the centre of said yoke and said brake operating arm, a pair of yokes in the same vertical plane as said first yoke, a connection from each end of the first yoke to the centres of said pair of yokes, a connection from each end of said second yokes to a brake, a pair of cross shafts, a crank arm on each of said cross shafts, a connection from the opposite end of each of said second yokes to each of said crank arms, a second crank arm on each of said cross-shafts and a brake connection to each of said second crank-arms.

In witness whereof, I have hereunto signed my name this 28th day of September 1927.

ROBERT ALFRED CROCKETT.